United States Patent
Gschwind

(10) Patent No.: US 8,108,846 B2
(45) Date of Patent: *Jan. 31, 2012

(54) COMPILING SCALAR CODE FOR A SINGLE INSTRUCTION MULTIPLE DATA (SIMD) EXECUTION ENGINE

(75) Inventor: Michael K. Gschwind, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 917 days.

This patent is subject to a terminal disclaimer.

(21) Appl. No.: 12/127,857

(22) Filed: May 28, 2008

(65) Prior Publication Data

US 2008/0229066 A1    Sep. 18, 2008

Related U.S. Application Data

(63) Continuation of application No. 11/278,639, filed on Apr. 4, 2006, now Pat. No. 8,010,953.

(51) Int. Cl.
*G06F 9/44* (2006.01)
*G06F 9/45* (2006.01)
*G06F 15/00* (2006.01)

(52) U.S. Cl. ........ 717/149; 717/106; 717/140; 717/151; 717/159; 712/1; 712/22

(58) Field of Classification Search .................. None
See application file for complete search history.

(56) References Cited

U.S. PATENT DOCUMENTS

| | | | |
|---|---|---|---|
| 5,933,650 A * | 8/1999 | van Hook et al. | 712/2 |
| 6,055,371 A * | 4/2000 | Okano | 717/160 |
| 6,292,886 B1 | 9/2001 | Makineni et al. | |
| 6,839,828 B2 | 1/2005 | Gschwind et al. | |
| 7,233,998 B2 | 6/2007 | Suzuoki et al. | |
| 7,350,057 B2 * | 3/2008 | Barlow et al. | 712/222 |
| 7,542,981 B2 * | 6/2009 | Choy et al. | 1/1 |
| 2004/0015682 A1 * | 1/2004 | Barlow et al. | 712/228 |
| 2004/0193838 A1 * | 9/2004 | Devaney et al. | 712/3 |
| 2005/0097301 A1 | 5/2005 | Ben-David et al. | |
| 2005/0125630 A1 * | 6/2005 | Liao et al. | 712/5 |

(Continued)

OTHER PUBLICATIONS

Franchetti et al., "Efficient Utilization of SIMD Extensions," IEEE, Feb. 2005.*

(Continued)

*Primary Examiner* — Insun Kang
(74) *Attorney, Agent, or Firm* — Frances Lammes; Stephen J. Walder, Jr.; Matthew B. Talpis

(57) ABSTRACT

A mechanism is provided for performing scalar operations using a SIMD data parallel execution unit. With the mechanisms of the illustrative embodiments, scalar operations in application code are identified that may be executed using vector operations in a SIMD data parallel execution unit. The scalar operations are converted, such as by a static or dynamic compiler, into one or more vector load instructions and one or more vector computation instructions. In addition, control words may be generated to adjust the alignment of the scalar values for the scalar operation within the vector registers to which these scalar values are loaded using the vector load instructions. The alignment amounts for adjusting the scalar values within the vector registers may be statically or dynamically determined.

11 Claims, 10 Drawing Sheets

U.S. PATENT DOCUMENTS

| | | | |
|---|---|---|---|
| 2005/0160097 A1 | 7/2005 | Kahle et al. | |
| 2005/0273770 A1* | 12/2005 | Eichenberger et al. | 717/136 |
| 2005/0283773 A1 | 12/2005 | Eichenberger et al. | |
| 2005/0283774 A1* | 12/2005 | Eichenberger et al. | 717/151 |
| 2006/0155955 A1 | 7/2006 | Kahle et al. | |
| 2006/0190700 A1* | 8/2006 | Altman et al. | 712/7 |
| 2007/0124722 A1 | 5/2007 | Gschwind | |
| 2007/0174825 A1 | 7/2007 | Eichenberger et al. | |
| 2007/0226686 A1* | 9/2007 | Beardslee et al. | 717/109 |
| 2009/0100252 A1* | 4/2009 | Barlow et al. | 712/222 |
| 2009/0144529 A1* | 6/2009 | Eichenberger et al. | 712/241 |

OTHER PUBLICATIONS

Eichenberger et al., "Vectorization for SIMD Architectures with Alignment Constraints", PLDI'04, Jun. 9-11, 2004, Washington, D.C., ACM, 12 pages.

USPTO U.S. Appl. No. 11/278,639, Image File Wrapper printed on Aug. 3, 2010, 1 page.

Wu, Peng et al., "Efficient SIMD Code Generation for Runtime Alignment and Length Conversion", Proceedings of the International Symposium on Code Generation and Optimization (CGO), 2005, 12 pages.

* cited by examiner

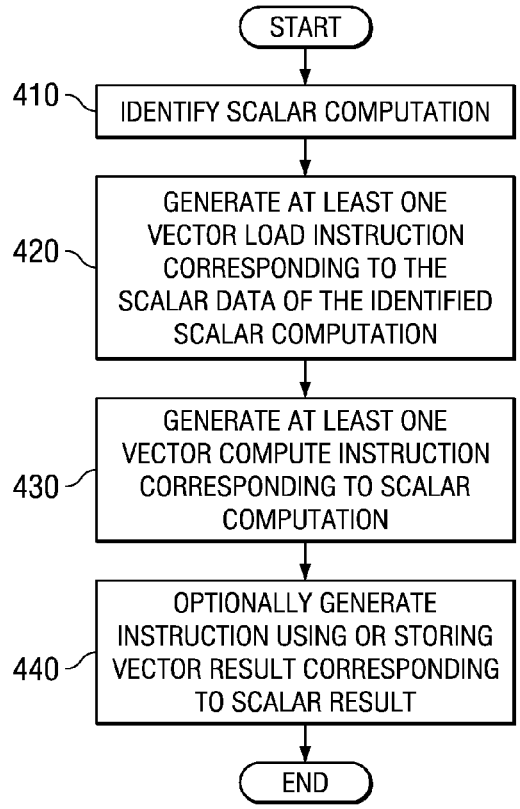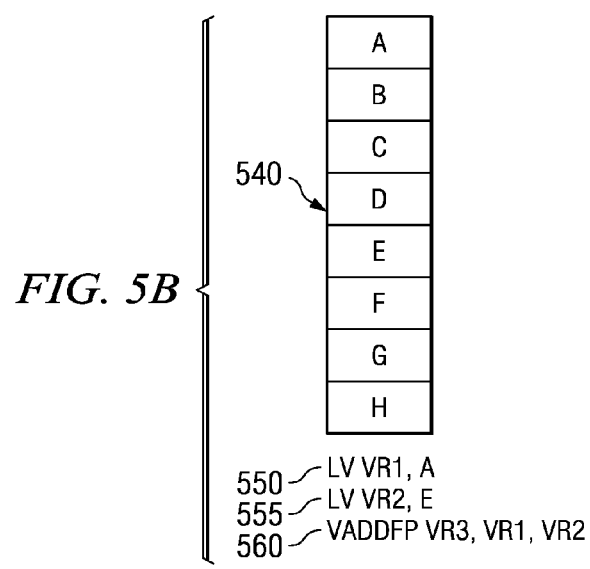

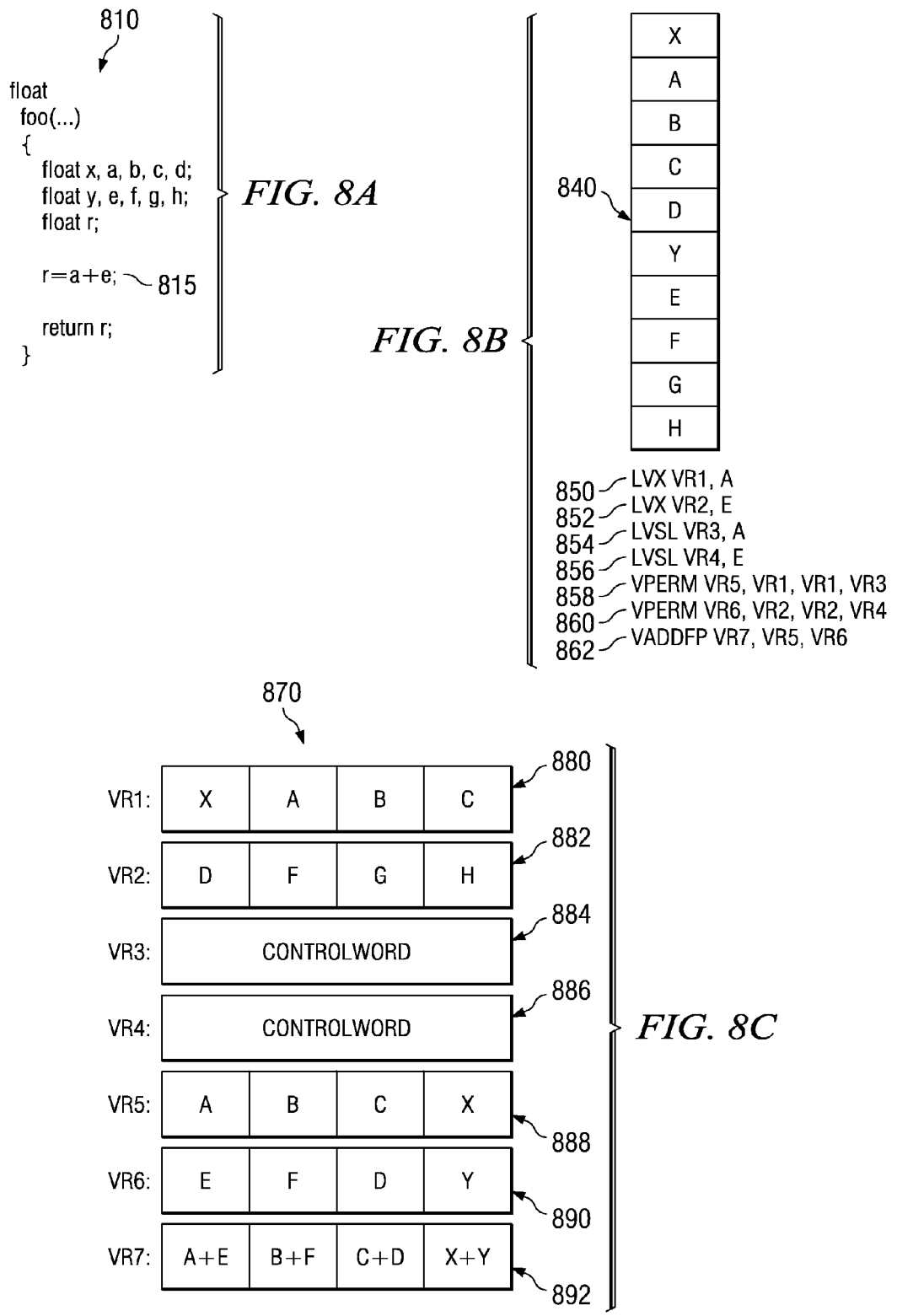

COMPILING SCALAR CODE FOR A SINGLE INSTRUCTION MULTIPLE DATA (SIMD) EXECUTION ENGINE

BACKGROUND

1. Technical Field

The present application generally relates to an improved system and method for compiling source programs to a machine language representation. More particularly, the present application is directed to a system and method for compiling scalar code for a data-parallel execution engine, such as a SIMD execution engine.

2. Description of Related Art

Contemporary high-performance processor designs provide data-parallel execution engines to increase the amount of performance available to application programs by using single-instruction multiple-data (SIMD) parallelism. These instructions encompass a variety of instruction set extensions, such as the IBM Power Architecture™ Vector Media extensions (VMX).

In high-level languages, data parallel execution can be achieved by using programming based on intrinsics, a form of inline assembly wherein assembly instructions are expressed in the form of pseudo-function calls. Moreover, the compiler can provide important functions such as register allocation using advanced register allocation techniques. In addition, data parallel execution may be achieved by vectorizing compilers that detect code blocks which can be transformed to exploit the data-parallel SIMD instructions.

Using data-parallel SIMD instructions to increase compute performance of a microprocessor has yielded significant increases in speed for many applications. However, extensive use of data-parallel execution engines has also revealed a number of shortcomings of the implementation and use of microprocessors using such extensions. Specifically, these shortcomings relate to the cost of combining scalar and vector data in computations, such as when a vector stored in a vector register needs to be scaled by a scalar value stored in a scalar register, and to the cost of implementing separate scalar and data-parallel SIMD execution units.

In accordance with prevailing implementations, to computationally combine vector and scalar data, scalar data stored in scalar registers is transferred from the scalar registers to vector registers, before computations are performed. Typically, the transfer of data from one class of register file to another class of register file is performed by storing data to memory using a store instruction from the first class of register file, and reloading them into the second class of register file using a load instruction to the second class of register file. Such indirect transfers of data are performed because, due to synchronization requirements, direct transfer between different execution units is complex and expensive.

Moreover, when implementing separate scalar and data-parallel SIMD execution units, functionality is duplicated between scalar execution units and data-parallel SIMD execution units. As a result, a microprocessor may contain a first set of integer execution units to perform integer scalar operations and a second set of integer execution units to perform integer data-parallel operations. Similarly, the microprocessor may have a first set of floating-point execution units to perform scalar floating-point operations and a second set of floating point operations to perform floating-point data-parallel operations. When the parallelism between scalar and data-parallel execution units cannot be exploited by applications, this duplication of execution units disadvantageously and needlessly leads to increased chip area, power dissipation, design complexity and verification cost.

SUMMARY

In view of the above, it would be beneficial to have an apparatus and method to reduce the cost of sharing data between scalar and SIMD data-parallel execution. Moreover, it would be beneficial to have an apparatus and method that permits the sharing of data and resources between scalar and data-parallel execution units. The illustrative embodiments provide such a method and apparatus.

In particular, the system, method, and computer program product provided by the illustrative embodiments provide mechanisms for performing scalar operations using a SIMD data parallel execution unit. With the mechanisms of the illustrative embodiments, scalar operations in application code are identified that may be executed using vector operations in a SIMD data parallel execution unit. The scalar operations are converted, such as by a static or dynamic compiler, into one or more vector load instructions and one or more vector computation instructions.

In addition to the above, if the scalar values of the scalar operation that are loaded to the vector registers using the vector load instructions are not aligned, mechanisms are provided for aligning these scalar values such that the vector computation instructions may be performed correctly. In such a case, control words may be generated to adjust the alignment of the scalar values for the scalar operation within the vector registers. In order to determine the amount of alignment adjustment that is required, a determination may be made as to whether the alignment amount can be statically determined or not. If the alignment amount can be statically determined, then alignment code is generated using the statically determined alignment amount. However, if the alignment amount cannot be statically determined, then code may be generated for dynamically computing the alignment amount. Code may then be generated for using the dynamically computed alignment amount to align the scalar values within the vector registers.

Furthermore, the illustrative embodiments provide mechanisms for providing improved selection of a computation slot for performing a scalar operation in a SIMD vector execution unit. With theses mechanisms, a data flow graph for scalar data having been selected to be processed in a SIMD vector execution unit is generated. The data flow graph is annotated with the alignment information for scalar inputs (leaves) and outputs (roots) of scalar computations performed in a SIMD vector execution unit, when those alignments can be statically derived. Computation slots for internal nodes are derived by propagating alignment information along graph edges. In one embodiment, an optional operation is performed for allocating variables based on desirable computational slots to further reduce alignment cost.

In addition to the above, the illustrative embodiments provide mechanisms for handling spill code and reloading spill code into registers. In addition, there are provided methods to improve code quality by exploiting type information.

In one illustrative embodiment, a method is provided for generating code to perform scalar operations on a vector execution unit. The method may comprise receiving application code that includes a scalar operation and generating a first load vector instruction, based on the scalar operation, for loading a first scalar value into a first vector register. The method may further comprise generating a second load vector instruction, based on the scalar operation, for loading a second scalar value into a second vector register and generating a vector computational instruction for combining the first scalar value in the first vector register with the second scalar value in the second vector register to thereby compute a scalar result. The first load vector instruction and the second load vector instruction may retrieve arbitrarily aligned data and align the arbitrarily aligned data with respect to the first and second vector registers.

The method may further comprise generating code to align a scalar data word of the first scalar value with respect to the first vector register and generating code to align a scalar data word of the second scalar value with respect to the second vector register. An alignment for the scalar data words associated with the first and second scalar values may be derived statically at compile time. Alternatively, an alignment for the scalar data words associated with the first and second scalar values may be derived dynamically by generating code to compute the alignment at program runtime.

The computation of the scalar result may occur using a statically designated slot of the first vector register and second vector register. Alternatively, the computation of the scalar result may occur using an arbitrary slot of the first vector register and second vector register. The storage layout of scalar variables may be optimized by at least one of allocating a memory word corresponding to the size of a vector register to hold the scalar value or selecting a memory location corresponding to a slot location reducing the amount of data alignment operations necessary. In addition, registers to be spilled from the register file may be merged in a vector register file.

In other illustrative embodiments, an apparatus and computer program product are provided for implementing the operations described above with regard to the method. The apparatus may comprise various means for performing the operations described above. The computer program product may comprise a computer usable medium having a computer readable program provided thereon. When the computer readable program is executed by a computing device, the computer readable program may cause the computing device to perform the various operations described above with regard to the method.

These and other features and advantages of the present invention will be described in, or will become apparent to those of ordinary skill in the art in view of, the following detailed description of the exemplary embodiments illustrative of the present invention.

BRIEF DESCRIPTION OF THE DRAWINGS

The novel features believed characteristic of an illustrative embodiment of the present invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 4 is an exemplary diagram illustrating an exemplary operation for generating code to perform scalar computations on a SIMD execution engine in accordance with an illustrative embodiment;

FIG. 5A is an exemplary diagram of application code for illustrating the generation of vector instructions to perform a scalar operation in accordance with an illustrative embodiment;

FIG. 5B is an exemplary diagram illustrating a data layout and machine code as generated by a compiler implementing an exemplary operation as outlined in FIG. 4;

FIGS. 8A, 8B and 8C are exemplary diagrams to illustrate the translation and operation of a program having been compiled in accordance with an illustrative embodiment;

DETAILED DESCRIPTION OF THE PREFERRED EMBODIMENTS

The illustrative embodiments are directed to providing a method, apparatus, and computer program product for sharing data between scalar and data-parallel execution, and for sharing hardware resources for scalar and data-parallel execution. Advantageously, the illustrative embodiments provide a method, apparatus, and computer program product to: (1) share scalar data by co-locating scalar and Single-Instruction Multiple-Data (SIMD) vector data in a SIMD vector register file; and (2) perform scalar computations in a data-parallel SIMD vector execution engine (henceforth also referred to as "scalar layering").

Figure 1:
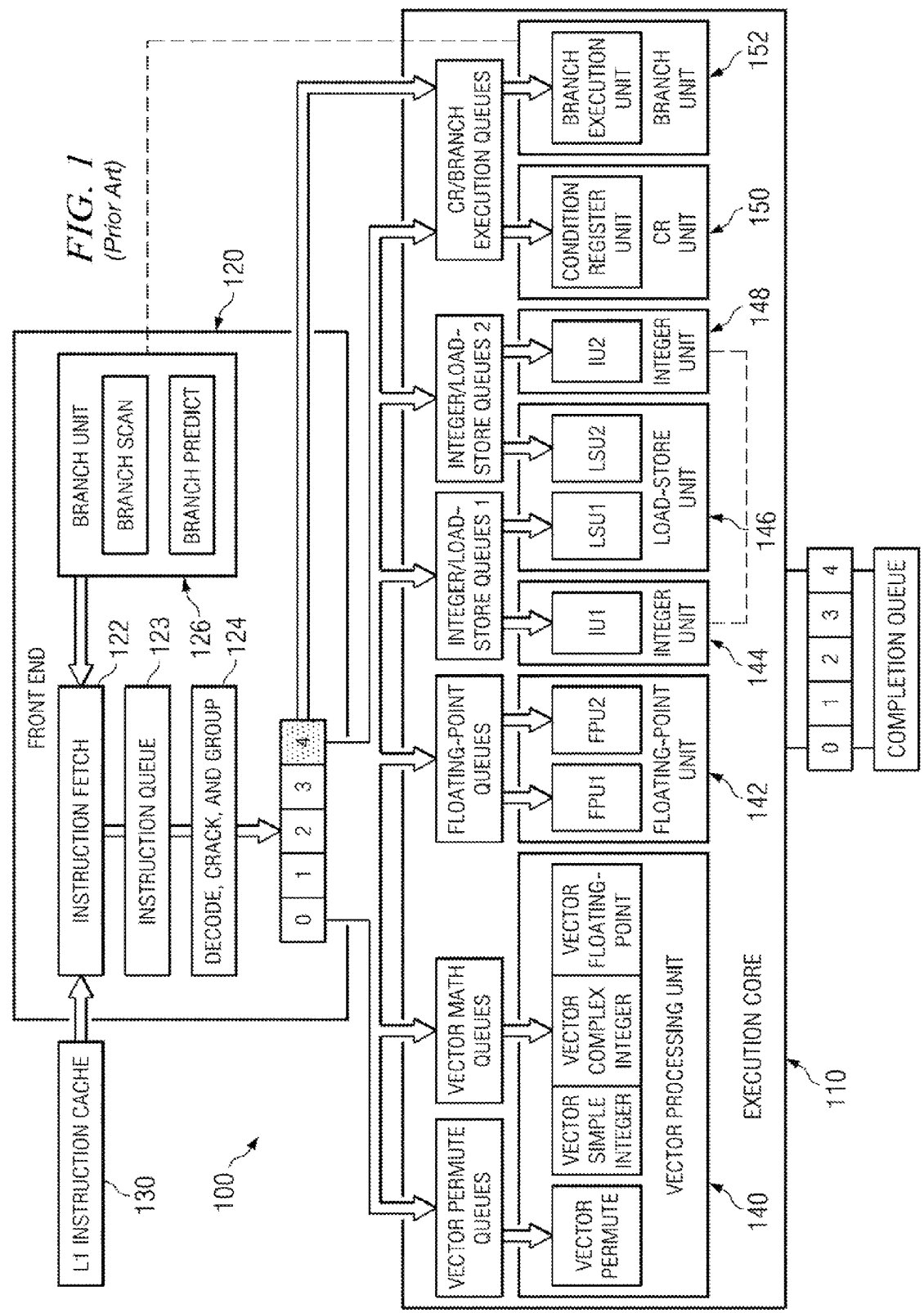
FIG. 1 is an exemplary block diagram of a microprocessor including at least one data-parallel execution unit in accordance with a known architecture.

Referring to FIG. 1, there is shown a microprocessor 100 including an execution core 110 in which exemplary aspects of the illustrative embodiments may be implemented. As shown in FIG. 1, the microprocessor 100 includes a front end 120 having instruction fetch logic 122, instruction queue 123, decode, crack and group logic 124, and branch unit 126. Instructions may be fetched from the L1 instruction cache 130 and queued in the instruction queue in accordance with information provided by branch unit 126. Instructions may then be dispatched to the execution core 110.

The execution core 110 includes a vector processing unit 140, a floating point execution unit 142, a first integer execution unit 144, a load-store execution unit 146, a second integer unit 148, a condition register unit 150, and a branch execution unit 152. The vector processing unit 140, in accordance with the illustrative embodiments herein, is a SIMD execution unit. The operation of these various elements when executing instructions dispatched from the front end 120 is generally known in the art and thus, a detailed explanation is not provided herein. With reference to the depicted architecture, the illustrative embodiments herein provide a mechanism for executing scalar operations, which normally would be handled by the first and second integer execution units 144 and 148, or the floating-point execution unit 142, in the vector processing unit 140 such that vector and scalar operations may share the same resources.

Figure 2:
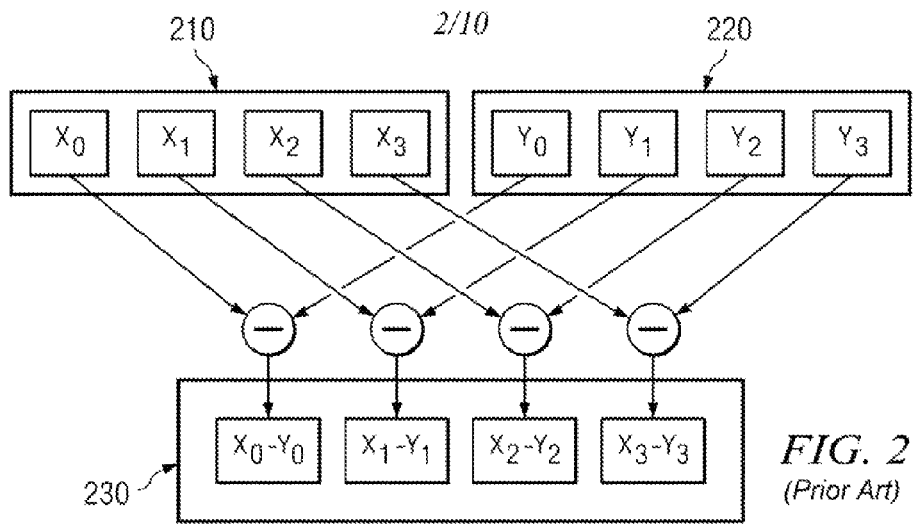
FIG. 2 is an exemplary diagram illustrating SIMD processing on an exemplary 4-element vector as is generally known in the prior art.

In order to understand the advantages of the illustrative embodiments over prior art mechanisms, it is best to first review the manner by which SIMD vector processing is performed. FIG. 2 is an exemplary diagram illustrating SIMD processing on an exemplary 4-element vector as is generally known in the art. As shown in FIG. 2, when executing a SIMD instruction, corresponding vector elements in each "slot", i.e., the position within a vector, are combined with corresponding vector elements of like slots in a second vector. The results of the combining of the vector elements yield a series of values to be stored in corresponding slots of a third result vector.

For example, the value x0 in the first "slot" of vector register 210 is combined with the value y0 in the first "slot" of vector register 220. In the depicted example, the SIMD instruction is a subtraction of the second vector from the first vector. Thus, the result value stored in the first "slot" of result vector register 230 is the difference value x0−y0. This same combination operation is performed for all slots of vector registers 210 and 220 to thereby generate the result vector stored in result vector register 230 having values x0−y0, x1−y1, x2−y2, and x3−y3.

Figure 3A:
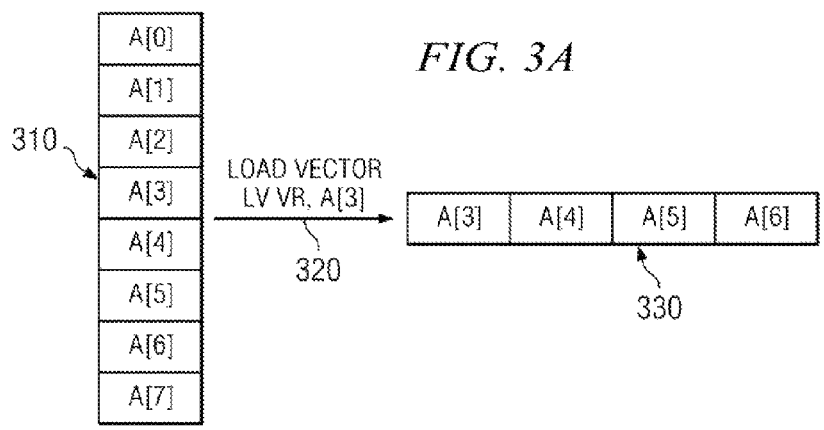
FIGS. 3A and 3B are exemplary diagrams that illustrate the access in accordance with support for unaligned access, and with a software-alignment policy.

In another aspect of SIMD vector processing, memory operations are supported. Referring now to FIG. 3A, in one specification of SIMD vector instructions, the architecture specification supports unaligned data access. In accordance with this specification, a load of vector data is performed starting at the address specified in the load instruction, encompassing a number of bytes commensurate with the vector size, starting at the specified address.

For example, assume a portion of memory 310 contains data values at addresses A[0] to A[7] as depicted. A load vector SIMD instruction 320 may be provided as LVX VR, A[3], meaning that the vector starting at memory address location A[3], and having a predetermined vector size, is loaded and stored in the vector result register VR 330. In a system that supports unaligned data access, in response to the load vector SIMD instruction 320, the data values starting at address A[3], up to the predetermined vector size, are loaded into the result vector register VR 330. In the depicted example, such a result vector comprises data values at memory addresses A[3], A[4], A[5], and A[6].

In another specification of SIMD vector instructions, the architecture specification may not directly support unaligned access, but may provide support for software alignment primitives, i.e. may provide software managed alignment. In accordance with one specification, a load instruction retrieves a number of bytes commensurate with the vector size, starting at an alignment boundary, and including the specified address. An example execution of a SIMD vector instruction using this alternative specification is shown in FIG. 3B.

Figure 3B:
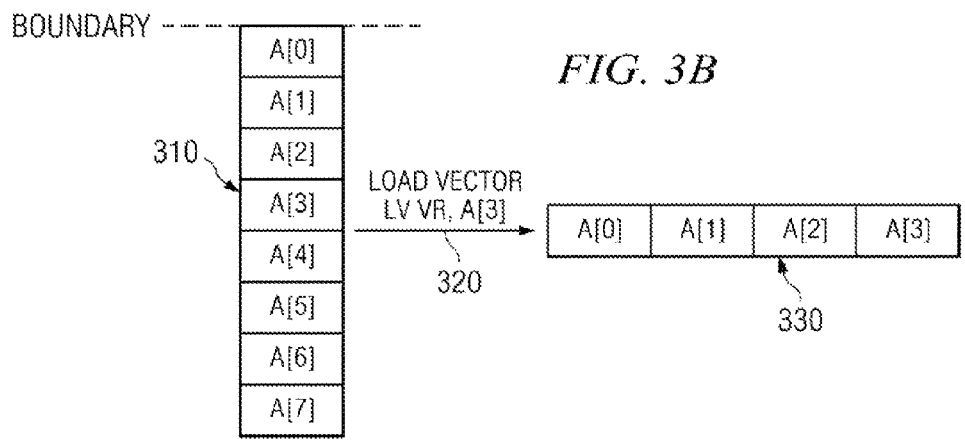

As shown in FIG. 3B, with the same portion of memory 310 and load vector SIMD instruction 320, a different resulting vector is stored in the result vector register 330. Specifically, because an alignment boundary 340 is specified at the memory location corresponding to the data value at address A[0], the data values at addresses A[0], A[1], A[2], and A[3] are retrieved and stored in the result vector register 330. Alignment boundaries may be specified according to the vector size used in the particular implementation. Since the system does not support unaligned access, vectors starting at the alignment boundary, having the predetermined vector size, and including the data value identified in the load vector SIMD instruction are retrieved. In the depicted example, since the data value at address A[3] is the target of the load vector SIMD instruction 320, and the alignment boundary is at address A[0], the vector comprising data values at addresses A[0] to A[3] is retrieved as the results of the load vector SIMD instruction 320.

In yet other implementations of SIMD instruction execution, the architecture specification may not support unaligned access, and may raise an unaligned data exception in response to an unaligned vector data access. Similarly, store operations can provide these three options in response to unaligned vector store instructions. Moreover, hybrids of these architectures are possible, wherein an architecture might support two types of load instructions, e.g., directed towards hardware-supported unaligned access, and software managed alignment, or supporting one of these options for load instructions, and another option for store instructions, and so forth.

In accordance with the definition of vector instructions, a vector instruction write-updating a register is considered a vector register instruction only if it write-updates a vector in its entirety. In accordance with this specification, a portion of the vector target register can be written with a default value, or a boundedly undefined value, but not be defined to remain unmodified when another portion of the vector register is written. The terms SIMD vector instruction, and data-parallel instruction, are used interchangeably to refer to such a vector instruction.

A scalar value refers to a single value in accordance with an input program representation. A vector consists of a collection of scalar values, each scalar stored in a "slot," the slot representing a position in a vector. The terms "subvector" and "subvector value" refer to a subset of slots. These terms may refer to one or more of the scalar values contained in a vector, but not the entirety of scalar values comprising a vector.

In accordance with one illustrative embodiment, a method, apparatus and computer program product are provided for generating code for performing scalar computations on a SIMD vector execution unit, such as SIMD vector execution unit 110 in FIG. 1. With the mechanisms of the illustrative embodiments, data is shared between scalar and data-parallel, or SIMD vector, execution units. In addition, the mechanisms of the illustrative embodiments permit sharing of hardware resources for scalar and data-parallel, or SIMD vector, execution.

FIG. 4 is a flowchart outlining an exemplary operation of a method for generating code to perform scalar computations on a data-parallel or SIMD execution engine in accordance with an illustrative embodiment. The method outlined in FIG. 4 may be implemented, for example, by a compiler that supports aligned accesses, such as described previously with regard to FIG. 3B.

As shown in FIG. 4, in accordance with an illustrative embodiment, the compiler identifies at least one scalar computation sequence to be performed on a data-parallel, e.g., SIMD, execution engine (step 410). In one illustrative embodiment, directed to a hardware implementation supporting a shared scalar/SIMD data-parallel floating point unit, all scalar floating point operations are selected to be executed on a data-parallel execution engine. In accordance with another illustrative embodiment, involving hardware supporting distinct scalar execution engines, a graph partitioning algorithm may be implemented to identify a first cluster of scalar operations to be executed on the scalar execution engine and a second cluster of scalar and optionally SIMD instructions to be executed on a data-parallel execution unit.

In accordance with one illustrative embodiment, some computation sequences involving specific floating point operations may be preferably executed on a scalar execution engine because of shorter latency. In accordance with an illustrative embodiment, some computation sequences involving specific floating point operations may be preferably executed on a scalar execution engine because the data-parallel execution unit does not implement direct hardware support. In another illustrative embodiment, scalar execution sequences generating a result to be used in conjunction with vector computation may be preferably executed on the data-parallel function unit to reduce data sharing overhead.

The compiler generates a first load instruction loading at least a first scalar source operand from memory with a vector load instruction loading an unaligned vector of data comprising, and starting at, the scalar value of the identified scalar computation of step 410 (step 420). This may be done by specifying the address of the scalar data value to be loaded as the address of the vector being loaded by the vector load instruction.

The compiler then generates a first computation instruction for computing at least a first desired scalar result value using an instruction that operates on a set of vector elements (step 430). Optionally, the compiler then generates instructions using the first desired scalar result to perform additional computations (step 440). These additional computations may include computing a second desired scalar result, computing a desired vector result, generating a condition indicator, computing a sequence to perform a store operation, and the like.

In one illustrative embodiment, the method outlined in FIG. 4 is implemented in a static compiler. In another embodiment, the method of FIG. 4 is implemented in a dynamic compiler. In at least one embodiment of a dynamic compiler, the input format to the dynamic compiler is an executable program format. In at least one other embodiment of a dynamic compiler, the input format to the dynamic compiler is in an intermediate byte code or similar virtual machine executable program format, such as P-code, JVM byte code, or the like.

In another illustrative embodiment, a hardware component of a microprocessor may be used to perform the translation of scalar operations to vector instructions, whereby a first set of scalar instructions, serving as an input representation, are translated into a set of instructions executed by a SIMD execution engine. This translation can be performed, for example, by dedicated decode logic (implemented as part of the decode logic of FIG. 1, for example,), microcode, or the like.

A write back of the scalar data computed by the code generated by the method of FIG. 4 to memory may be performed using a sequence of instructions including at least one store operation. This sequence of instructions may be generated in the optional step 440. An implementation of step 440 to generate the sequence of instructions, including at least one store operation, should be cognizant of the issue of excess data being computationally generated by vector instructions, and being stored in vector registers. That is, since the vector instructions are being used to perform scalar computations, all "slots" in the vector registers, with the exception of the scalar value "slots" store data that is extraneous to the scalar computation. Thus, for example, if the scalar computation is to add x0 to y0 in FIG. 2, then the "slots" storing x1 to x3 and y1 to y3 are extraneous to the scalar computation. It is important that the sequence of instructions including at least one store operation be generated in view of this situation.

In one illustrative embodiment, this is solved by allocating a scalar variable to be processed using vector instructions that operate on a vector word to a memory area corresponding to the size of a vector register. In another embodiment, a vector is stored to memory (typically using a temporary location allocated on the stack, heap, a data segment, or other appropriate memory area) using a vector store instruction. A single scalar element may then be reloaded from the memory location using a scalar load instruction for further processing as a scalar value, or for storing in densely packed memory using a scalar store instruction.

In yet another illustrative embodiment, code is generated for an architecture that supports sub-width vector store instructions. In such an embodiment, the architecture provides the ability to store the scalar value without storing the excess data also present in the vector register. In a further illustrative embodiment, code for storing a scalar value is generated by a data load/merge/store sequence loading a vector register comprising a number of bytes corresponding to the vector length of a vector, performing a merge operation, and storing a vector register containing the scalar result concatenated with data to be retained in memory.

Figure 5C:
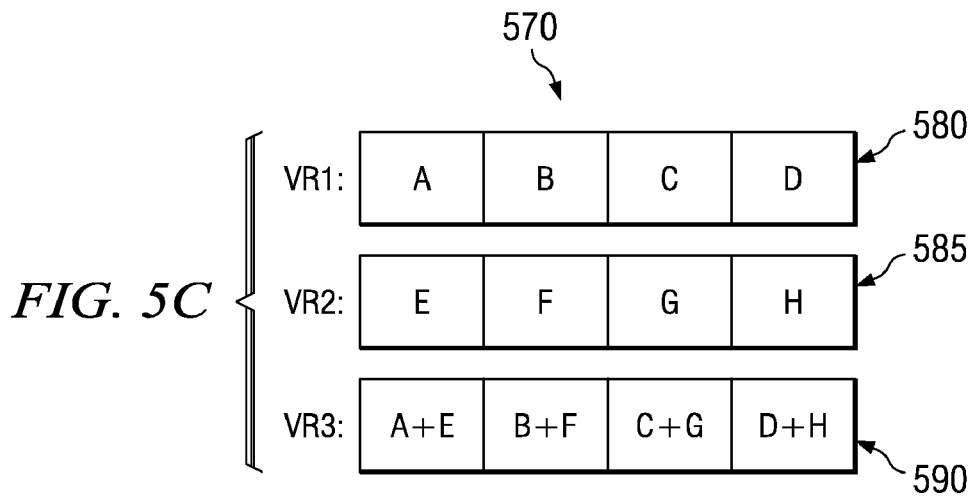
FIG. 5C is an exemplary diagram illustrating an execution of the code generated in FIG. 5B.

Referring now to FIGS. 5A, 5B and 5C, there is shown exemplary application code (generally indicated by reference numeral 510), exemplary data layout (generally indicated by reference numeral 540) and machine code (elements 550-560) as generated by a compiler implementing the method of FIG. 4, and the execution of the generated code (execution results generally indicated by reference numeral 570), respectively. The examples shown in FIGS. 5A-5C are for an architecture as specified by the Power Architecture™ VMX instruction set, but assuming architectural support for unaligned load and store accesses.

As shown in FIG. 5A, the application code 510 includes a scalar operation 515 for adding the scalar data value A to the scalar data value E. With the illustrative embodiments this scalar operation 515 is performed using vector registers in a data-parallel or SIMD operation.

Referring now to FIG. 5B, there is shown a data layout 540 and machine code 550-560 generated by a compiler implementing a method as outlined in FIG. 4 on the scalar operation 515 in the application code 510. As shown in FIG. 5B, the compiler, based on the scalar operation 515, generates a first load vector instruction 550 for loading a number of bytes starting at the address indicated by the address of variable "A" into vector register VR1.

In addition to variable "A", other data is loaded, which is not specified by the program, and does not represent useful data for the purpose of computing result "R" in scalar operation 515 of FIG. 5A. Specifically, the excess data being so loaded is the result of internal compiler decisions, is dependent on the specific compiler used, and is not readily discernable by analysis of the program source code. An exemplary result being so loaded is shown as the contents of vector register VR1 and indicated by reference numeral 580 in FIG. 5C. These additional data values B to D are a part of the extraneous data values referred to previously.

In addition to the first load vector instruction 550, a second load vector instruction 555 is generated by the compiler for loading a number of bytes starting at the address indicated by the address of variable "E" into vector register VR2. In addition to variable "E", other data is loaded, which is not specified by the program, and does not represent useful data for the purpose of computing result "R". Specifically, the excess data being so loaded is the result of internal compiler decisions, is dependent on the particular compiler used, and is not readily discernable by analysis of the program source code. An exemplary result being so loaded is shown as the contents of vector register VR2 and indicated by reference numeral 585 in FIG. 5C. These additional data values F to H are also part of the extraneous data values referred to previously.

In addition to load vector instructions 550 and 555, the compiler further generates a computational vector operation instruction vaddfp 560 that generates the result "R" in a first slot of a vector register VR3 590 in FIG. 5C. In addition to the result value "R" in slot 1 of the vector register VR3 590, additional excess results are generated that correspond to the operation specified by the computational vector instruction 560 being performed on unspecified excess data having been loaded by vector load instructions 550 and 555 and being present in vector registers 580 and 585.

Those skilled in the art will appreciate that performing accesses beyond data allocated by an allocation, i.e. access of data beyond the scalar values required for the scalar operation, can have undesirable side effects especially when bytes corresponding to excess data refer to unavailable data. Data may be unavailable when a vector crosses a protection boundary and a protection violation may be raised corresponding to a disallowed access to excess data. Since the disallowed access to excess data is not specified by the program, this can result in undesirable side effects which cannot be predicted or remedied by the application programmer and may lead to the incorrect execution of an otherwise correct program.

For example, with the example shown in FIG. 3A, the intent of the LV instruction is to load the value A[3] into the register VR. However, because this is a SIMD register, additional data values A[4], A[5], and A[6] are also loaded into the SIMD register VR. If the data for address A[6] is inaccessible because it is an illegal address, the LV instruction would generate a violation even though there is no real programmer error. Because A[6] is excess data with respect to the LV instruction the program should not be terminated, however this is what would happen without appropriate processing of such situations.

This situation would not arise in the exemplary operation of FIG. 3B because the data in FIG. 3B is always accessed in an aligned manner. Data protection boundaries on modern architectures are multiples of the alignment boundaries, i.e. data can never cross a protection boundary when it is naturally aligned—it is either complete on this side or the other side of the protection boundary. Thus, the situation described above with reference to FIG. 3A would not occur.

The following describes exemplary solutions for handling the processing of scalar data when scalar data is provided at the edge of a data boundary, i.e. where the scalar item is within the allowed data access area but a portion of the excess data being loaded is not within the allowed data access area. This situation is important to address because, by definition, there is always at least one element at the end of a memory page (or other allowed access area) and computing on this element causes problems when not carefully handled.

Any of these different solutions, or even modifications of these solutions, may be used without departing from the spirit and scope of the present invention.

In one illustrative embodiment of the operation outlined in FIG. 4, the architecture may support vector element access instructions where only a sub-vector is accessed (e.g., using a "load vector element" instruction) and protection verification is only performed for that sub-vector. When such facilities are available, a preferred embodiment of the operation outlined in FIG. 4 uses these facilities. In essence the vector element access instructions tell the hardware what data is really required and to fill the rest with some unimportant data values (excess data). This is the best solution the above problem, however not all processors support this type of vector element access instruction.

In another illustrative embodiment, the operation outlined in FIG. 4 may identify when a vector load has accessed illegal data and may determine whether the intent was to access just a sub-word that was in fact legal. If the intent was to access just a sub-word, then the operation may behave as if a sub-vector load was specified.

In yet another illustrative embodiment, data areas accessed by vector load instructions retrieving excess data are preferably extended by at least one word, such that data accesses at area boundaries may safely retrieve excess data. Typically, this involves adding at least one vector word (or more, to achieve desirable alignment properties) to program-specified data segments, the stack and the heap area. This is preferably done by a linker, and indicated in the object file format generated by the compiler implementing the method of FIG. 4.

For store instructions, similar options for addressing the above problem are provided. That is, a store element/sub-vector store instruction may be provided for specifying which sub-vector is being stored. Alternatively, if the processor does not support sub-vector store instructions, the sub-vector store instruction may be emulated by using a load/merge/store sequence. When that sequence refers to data that is not accessible using the load and store instructions of the sequence, the program may determine what sub-vector store this sequence was implementing and may identify another way to generate the desired behavior and skip the data load/merge/store sequence.

In some exemplary implementations, memory mapped I/O facilities are present, and separation between data areas and memory-mapped I/O areas must be guaranteed. However, with a system executing programs generated by a compiler implementing the method of FIG. 4, at least one data area may not be able to be appropriately padded using the word extensions described previously. In a UNIX system, for example, this may be due to performing application-controlled memory mapping, such as using the mmap( ) UNIX page mapping facility.

When the method of FIG. 4 is implemented on an architecture that supports non-faulting load instructions, one illustrative embodiment uses these non-faulting load instructions where data corresponding to protected data are not provided and a default value may be provided. In another architecture in which the method of FIG. 4 may be implemented, instructions accessing protected data always generate an exception event.

In one embodiment, the software emulates a non-faulting load by retrieving the first accessible data value and combining it with a default value representing unaccessible data. In some implementations, this may have the undesirable effect of masking actual programming errors. That is, this solution may not avoid the error but instead may produce garbage data in cases where the emulation was not intended, thereby leading to silent data corruption rather than an immediate indication of a programming error before data corruption can occur.

In some implementations of the illustrative embodiments, a determination may be made as to whether such masking of actual programming errors may occur. This may be accomplished in a variety of different ways. For example, an explicit list of vector instructions, with which emulation of non-faulting loads (where loads do not cause a misaligned address exception when presented with misaligned address information) may be accomplished (effectively providing and layering a new type of load operation using a side table) and may lead to masking of programming errors, may be provided. In another example, information may be encoded in an unused instruction field that indicates that emulation of the instruction as a non-faulting load is safe (effectively providing and layering a new type of load operation using the field). Non-faulting loads may be emulated by entering a code sequence targeted at producing the execution results of a corresponding non-faulting instruction and skipping the emulated instruction.

In another example, a faulting load may be correlated back to an executable format representing scalar load instructions distinctly from vector load instructions (e.g., in a compiler implementing the method of FIG. 4 in a static or dynamic binary compilation environment). In such a case, a non-faulting load instruction may be emulated only if the original load instruction corresponds to a scalar operation. In one embodiment, a further check is provided to determine the exact range of the original scalar access, and perform additional safety checks thereupon.

When performing stores in the presence of protection boundaries, e.g., page boundaries, segment boundaries, or other such boundaries as may be used to establish memory protection in accordance with modern data processing systems, the solutions presented above can be suitably extended to the management of store instructions.

In a preferred embodiment, vector store element instructions are used, said store element instructions being equipped to store a single scalar element to memory. In accordance with a preferred embodiment of a store vector element instruction, a store vector element instruction only raises an exception when the scalar data element refers to memory outside a memory protection area.

In another embodiment, data areas are extended, having suitably similar write protection settings, to allow execution of a variety of solutions to store data.

In one illustrative embodiment of a compiler implementing the method of FIG. 4 and using a load/merge/store sequence, there are interspersed other instructions in response to an instruction scheduling step having been performed by the compiler. Before program execution is continued, interspersed instructions are also properly emulated before continuing with the first instruction following the load/merge/store sequence.

Referring now to an implementation of data-parallel SIMD processing using an architecture in accordance with FIG. 3B, the architecture specification does not directly support unaligned access, but provides support for software alignment primitives. In accordance with this architectural specification, the method of FIG. 4 may be modified to include support for software-managed data alignment handling.

Figure 6:
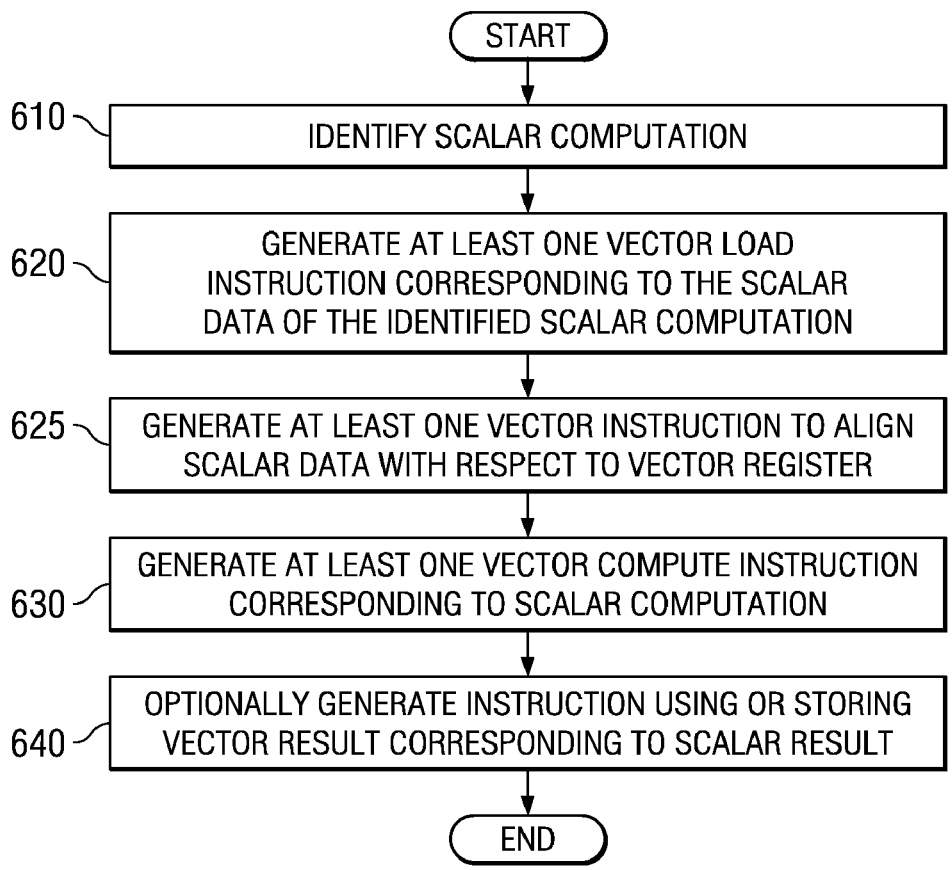
FIG. 6 is an exemplary diagram that illustrates the generation of code to perform scalar computations on a SIMD execution engine in accordance with an illustrative embodiment on an architecture with support for software-managed alignment handling.

FIG. 6 is a flowchart outlining an exemplary operation in accordance with an illustrative embodiment for providing code that generates scalar computation sequences on a data parallel execution engine including support for software-managed data alignment handling. In an illustrative embodiment, the operation outlined in FIG. 6 may be performed by a compiler operating on application code, for example.

As shown in FIG. 6, this operation may comprise identifying at least one scalar computation sequence to be performed on a data-parallel SIMD execution engine (step 610). A first load instruction for loading at least a first source operand with an instruction loading a vector of data wherein the data specified by the address are comprised in the vector, but not aligned with respect to the vector register (step 620). The unaligned vector of data may comprise, and start at, the scalar value of the scalar computation sequence. The address of the vector being loaded is derived from the scalar element address provided to the load instruction as shown in FIG. 3B, and as generally specified for load vector instructions in the IBM Power Architecture™ VMX instruction set.

At least one instruction for aligning scalar data with respect to the vector register is generated (step 625). A first computation instruction for computing at least a first desired scalar result value with an instruction computing on a set of vector elements is generated (step 630).

Optionally, instructions using the result may be generated to perform additional computations (step 640). These additional computations may include, for example, computing a scalar result, computing a vector result, generating a condition indicator, performing a sequence to perform a store operation, and the like.

In one illustrative embodiment, the operation outlined in FIG. 6 may be implemented in a static compiler. In another illustrative embodiment, the operation may be implemented in a dynamic compiler. In at least one embodiment of a dynamic compiler, the input format to the dynamic compiler is an executable program format. In at least one other embodiment of a dynamic compiler, the input format to the dynamic compiler is in an intermediate byte code or similar virtual machine executable program format, such as P-code, Java Virtual Machine (JVM) byte code, or the like.

In another illustrative embodiment, a hardware component of a microprocessor may be used to perform the translation of scalar operations to vector instructions, whereby a first set of scalar instructions, serving as an input representation, are translated into a set of instructions executed by a SIMD execution engine. This translation can be performed, for example, by dedicated decode logic (implemented as part of the decode logic of FIG. 1, for example,), microcode, or the like.

When generating alignment code, in one illustrative embodiment, all computation is performed in a predefined computation slot. In accordance with this embodiment, data is aligned to the computation slot using one or more alignment instructions. A variety of instructions can be used to achieve alignment, such as rotate instructions, shift instructions, permute instructions, and the like.

When generating code for some alignment sequences to dynamically align data under software control, the realignment amount can be statically determined. A static determination of the realignment amount may be performed when the address, or a sufficient number of low-order bits of the address, are known.

In embodiments where the full address cannot be known, low-order data bits can be determined by guaranteeing a minimum alignment for key parameters, such as stack and frame pointers, or the beginning of a data segment. The address may then be modified by adding a known amount, a known multiple of an unknown amount, and so forth.

When generating code for some alignment sequences, the realignment amount cannot be statically determined. In such cases, additional code may be generated to dynamically compute the realignment amount at runtime. The dynamically computed realignment amount may be used to dynamically align data under software control.

Figure 7A:
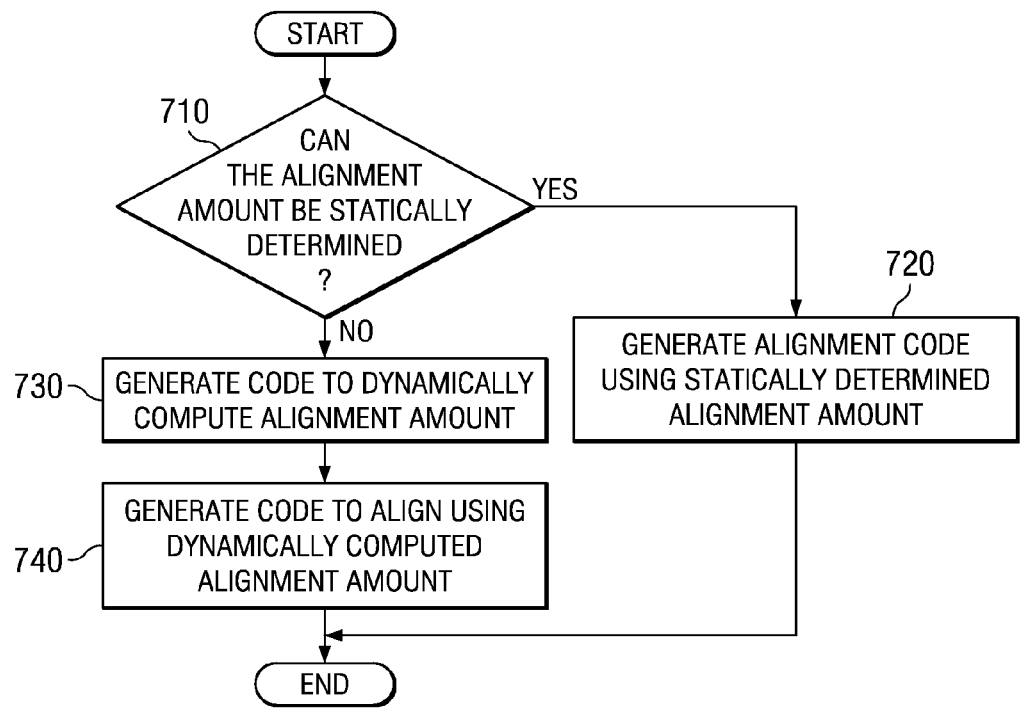
FIG. 7A is an exemplary diagram that illustrates an exemplary operation for determining whether alignment can be derived at compile time or must be generated at program execution time.

Referring now to FIG. 7A, a flowchart of an exemplary operation for generating alignment code is provided. The operations shown in FIG. 7A may correspond, for example, to step 625 in FIG. 6. These operations may be performed by a compiler operating on application code, for example.

As shown in FIG. 7A, the method starts with a determination as to whether the alignment amount can be statically determined at runtime (step 710). This determination may be made, for example, by determining whether the address can be completely derived or a sufficient number of low-order bits can be derived.

If the alignment amount can be statically determined by the compiler, code is generated to dynamically realign scalar data under software control in accordance with the illustrative embodiments using the statically determined alignment amount (step 720) and the operation terminates. In accordance with one illustrative embodiment, the generation of the code to dynamically realign scalar data comprises using the Power Architecture™ VMX LVSL instruction to compute a permute control word reflective of data arrangements necessary to align the loaded data word, based on the address specified as parameter to the LVSL instructions, e.g., LVSL instructions 854 and 856 described hereafter.

Alternatively, if the alignment amount cannot be statically determined by the compiler, code is generated to dynamically compute the alignment amount and store the result in at least one storage element, e.g., a register (step 730). Thereafter, code is generated to dynamically realign data under software control in accordance with the illustrative embodiments using the result computed by the code generated in step 730 (step 740) and the operation terminates. Those skilled in the art will understand that in lieu of generating code, internal representation pseudocode may be generated and injected into the program to be further optimized before actual code generation following the teachings of the illustrative embodiments.

Figure 7B:
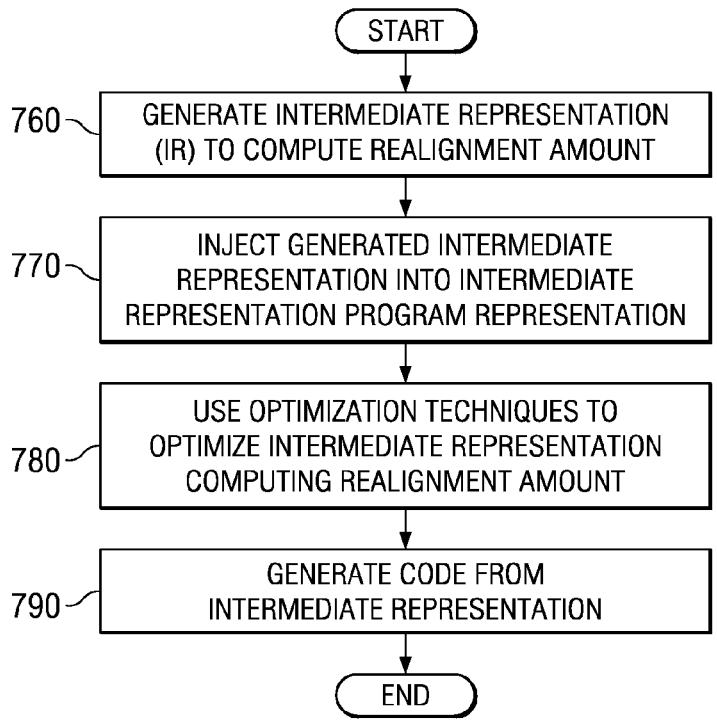
FIG. 7B is an exemplary diagram illustrating an exemplary operation for generating and optimizing an IR representation corresponding to computation of alignment information, in accordance with an illustrative embodiment.

FIG. 7B is a flowchart outlining an alternate operation for generating and optimizing realignment code in accordance with another illustrative embodiment. The operation outlined in FIG. 7B may be part of step 625 in FIG. 6, for example. The operations shown in FIG. 7B may be performed by a compiler, either static or dynamic, operating on application code, for example.

As shown in FIG. 7B, the operation starts with internal representation (IR) pseudocode, i.e. the symbolic language used by the compiler to represent and optimize a program internally) is generated representing the computation of the realignment amount (step 760). The generated IR is injected into the IR-based program representation used by the compiler (step 770).

Optimizations are performed on the IR, optimizing the IR sequence generating the realignment amount, using such techniques as constant propagation, constant folding, symbolic transformations, and the like (step 780). In at least one embodiment, special optimizations are performed to determine properties of variables (i.e., multiples of a value, and so forth) which allow optimization of alignment code generation even if a constant value cannot be derived.

Code may then be generated from the IR program representation (step 790). The operation then terminates.

FIG. 8A is an exemplary diagram illustrating exemplary application code 810 for illustrating an operation of an illustrative embodiment. As shown in FIG. 8A, the application code 810 is similar to the application code shown in FIG. 5A and includes a scalar operation 815 for adding a scalar value "A" to a scalar value "E" to generate a result "R".

FIG. 8B is an exemplary diagram illustrating an exemplary data layout and machine code as generated by a compiler implementing the operation outlined in FIG. 6 on the application code of FIG. 8A, preferably in conjunction with one of the operations shown in FIGS. 7A and 7B. As shown in FIG. 8B, a first load vector instruction 850 for loading a number of bytes starting at an aligned address generated from an unaligned address of the variable "A" of FIG. 8A is generated by the compiler. The aligned address generated in accordance with the specification of the VMX instruction "lvx" comprises the word storing "A", into vector register VR1.

In addition to variable "A", other data is loaded, which is not specified by the program, and does not represent useful data for the purpose of computing result "R" in FIG. 8A. Specifically, the excess data that is loaded is the result of internal compiler decisions, is dependent on the specific compiler, and is not readily discernable by analysis of the program source code. An exemplary result being loaded as a result of the first load vector instruction 850 is shown as the contents of vector register VR1 880 in FIG. 8C.

In addition to the first load vector instruction 850, a second load vector instruction 852 for loading a number of bytes starting at an aligned address generated from an unaligned address of the variable "E" into vector register VR2 is generated by the compiler. In addition to variable "E", other data is loaded, which is not specified by the program, and does not represent useful data for the purpose of computing result "R". Specifically, the excess data that is loaded is the result of internal compiler decisions, is dependent on the specific compiler used, and is not readily discernable by analysis of the program source code. An exemplary result of the second load vector instruction 852 is shown as the contents of vector register VR2 882 in FIG. 8C.

In addition instructions 854 and 856 are generated in accordance with step 730 of FIG. 7A to dynamically compute alignment control words in registers VR3 884 and VR4 886, corresponding to and encoding alignment amounts for variables "A" and "E". As is generally known in the art, the LVSL instructions 854 and 856 may be used to create the permute control vector to be used by a subsequent VPERM instruction 858, 860. For example, assume that X and Y are the contents of vectors vA and vB specified by a VPERM instruction. The control vector created by the LVSL instruction causes the VPERM to select the high-order 16 bytes of the result of shifting the 32-byte value X||Y left by sh bytes (sh=the value in EA[60-63]). These instructions may also be used to rotate or shift the contents of a vector register left or right by sh bytes.

VPERM instructions 858 and 860 in FIG. 8B are instructions for dynamically performing data alignment under control of control words in registers VR3 884 and VR4 886. These instructions dynamically align the variables "A" and "E" into a leftmost computation slot of vector registers VR5 888 and VR6 890 in FIG. 8C. The instructions 858 and 860 are generated in accordance with step 740 of FIG. 7A.

A computational vector operation vaddfp 862 is also generated by the compiler for generating the result "R" in a first slot of a vector register VR7 892. In addition, the computational vector operation vaddfp 862 also generates additional excess results corresponding to the operation specified by the vector instruction being performed on unspecified excess data having been loaded by vector load instructions 850 and 852 and dynamic realignment instructions 858 and 860. This excess data is present in vector registers VR5 888 and VR6 890.

With regard to the loading of excess data in a vector instruction set with software managed alignment, for those architectures specifying protection boundaries to be multiples of vector register sizes, and starting at multiples of vector register sizes, no crossing of protection boundaries can occur. Those skilled in the art will further appreciate that in the exemplary code sequence of FIG. 8B, there is an assumption of natural alignment of scalar values with respect to their data types, and hence the need to deal with instructions straddling aligned vector register boundaries is obviated. Those skilled in the art will further appreciate how to apply the teachings set forth herein to application environments wherein natural alignment of scalar data is not provided.

Thus, the above illustrative embodiments set forth a preferred program sequence for the dynamic alignment of scalar data in a vector register. The illustrative embodiments use the "vperm" VMX instruction under the control of dynamically computed alignment information, preferably with the "lvsl" VMX instruction. The present invention, however, is not limited to the use of such instructions and the illustrative embodiments are only provided as being exemplary of the present invention. Other instructions may be used to achieve the purposes of the present invention without departing from the spirit and scope of the present invention.

For example, those skilled in the art will appreciate that the "vsldoi" instruction, which is generally known in the art, may be used in an illustrative embodiment of alignment for statically determined alignment information. For example, if it is known that initially, X is aligned at a 128b vector boundary, then the sequence illustrated in FIG. 8B may be replaced with the following shorter sequence:

LVX VR1, A
LVX VR2, E
VSLDOI VR5, VR1, VR1, 4
VSLDOI VR6, VR2, VR2, 8
VADDFP VR7, VR5, VR6

This eliminates the overhead of using an instruction to compute dynamic alignment.

In such a case, the vsldoi instruction may advantageously allow the encoding of an immediate field and hence obviate the initialization of a vector register with a control word corresponding to the shift amount.

The above illustrative embodiments set forth preferred embodiments of scalar computation within the context of a vector instruction set supporting dynamic data alignment under software control. Those skilled in the art will understand that scalar layering can be performed also for SIMD vector instruction sets, where correct alignment is required, by using additional software sequences to mask off at least one address bit and generate the required alignment. In one illustrative embodiment, masking may be done by logically "ANDing" an address with a mask that is adapted to remove bits from the address. For example, the address 0x00FFEF75 may be logically "ANDed" with a mask 0xFFFFFFF0 to generate an aligned address of 0x00FFEF70. Those skilled in the art will understand that the remainder of steps for the vector instruction sets requiring full alignment are then performed in accordance with the steps for software managed alignment, as described above.

Referring now to the selection of a vector slot for computation, in one illustrative embodiment, a predetermined vector slot is used for all scalar computations. In another optimized embodiment, the computation slot is dynamically determined by the compiler to reduce and/or minimize the cost of data alignment. In accordance to yet another embodiment, variable allocation is performed in conjunction with computation slot determination to further reduce the cost of data re-alignment.

Figure 9A:
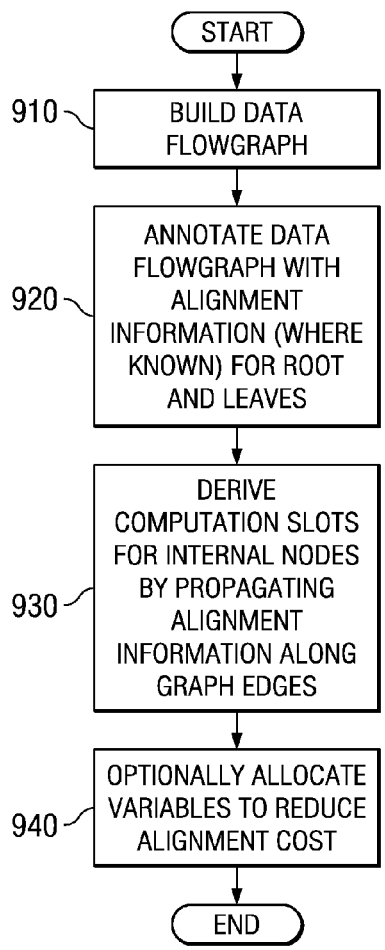
FIGS. 9A and 9B are exemplary diagrams illustrating an exemplary operation for reducing the number of alignment operations performed and optionally allocating scalar variables at alignment boundaries chosen to further reduce alignment operations, in accordance with an illustrative embodiment.
Figure 9B:
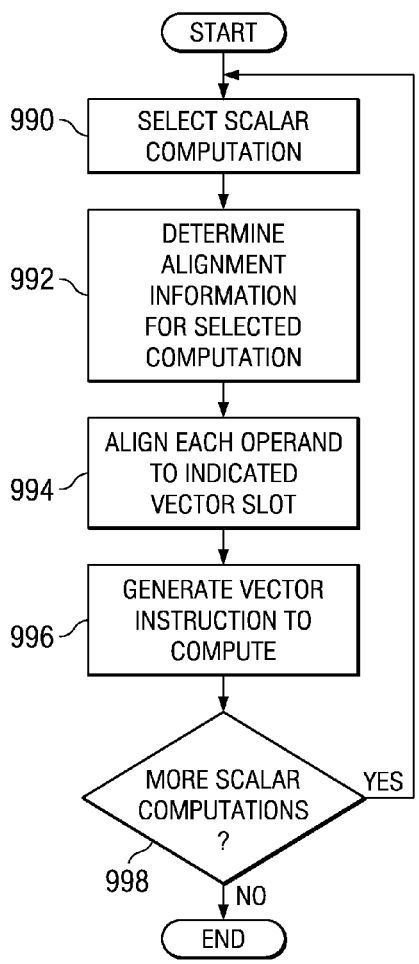

Referring now to FIGS. 9A and 9B, flowcharts outlining an exemplary operation for providing improved selection of a computation slot in accordance with an illustrative embodiment are provided. The exemplary operation outlined in FIG. 9A may be performed, for example, by a dynamic or static compiler operating on application code. For example, the operation outlined in FIG. 9A may be performed by a compiler as part of step 625 in FIG. 6 before the execution of the operations in FIGS. 7A and 7B, such that the operations in FIGS. 7A and 7B may use information about the desired computation slot for each computation in FIGS. 7A and 7B.

As shown in FIG. 9A, the operation starts with the building of a data flow graph for scalar data having been selected to be processed in a SIMD vector execution unit (step 910). The generation of data flow graphs is generally known in the art and thus, a detailed explanation of this operation is not provided herein.

The data flow graph is annotated with the alignment for scalar inputs (leaves) and outputs (roots) of scalar computations performed in a SIMD vector execution unit, when those alignments can be statically derived (step 920). Computation slots for internal nodes are derived by propagating alignment information along graph edges (step 930). In one embodiment, an optional operation is performed for allocating variables based on desirable computational slots to further reduce alignment cost, as described hereafter (step 940). The operation then transfers this information to the operation outlined in FIG. 9B.

FIG. 9B is a flowchart outlining an exemplary operation for using the alignment information generated by the exemplary operation of FIG. 9A to generate a vector instruction to be computed in order to perform a scalar operation. As shown in FIG. 9A, the exemplary operation starts with a scalar computation being selected (step 990). Alignment information for the selected scalar computation is then determined (step 992) and each operand is aligned to an indicated slot based on the alignment information (step 994). A vector instruction is generated for computing the scalar operation based on the aligned operands (step 996). A determination is then made as to whether there are additional scalar computations to be performed (step 998). If so, the operation returns to step 990; otherwise, the operation terminates.

The illustrative embodiments allow the adoption of alignment policies for the purpose of compiling scalar applications to exploit SIMD execution units. A discussion of alignment policies for vector computation, can be found in Eichenberger et al., "Vectorization for SIMD Architectures with Alignment Constraints", PLDI 2004. While this document describes the use of alignment policies for vector computation, such alignment policies are not adapted for scalar computation, as with the illustrative embodiments herein. It should be noted that the use of alignment policies in conjunction with compiling scalar applications to exploit SIMD execution units has not been possible with known systems prior to the present invention.

In accordance with one illustrative embodiment, a "lazy align" policy, such as described in the above Eichenberger et al. document, may be adopted. According to this alignment policy, for each operation, alignment is chosen to reflect the most frequent input alignment.

While the above illustrative embodiments may be used to improve alignment assignment, it is another object of the illustrative embodiments to further reduce the cost of dynamic alignment. Such reduction in cost is the focus of step 940 in FIG. 9A described previously. With optional step 940, in one illustrative embodiment, leaf nodes (representing scalar inputs) with as yet unassigned alignment constraints can be allocated to a desirable alignment slot chosen to minimize alignment cost. In a lazy alignment policy, the selected alignment slot for data is based on that of other inputs to the first operator. In a "dominant align" policy, alignment occurs to the dominant alignment.

Because a variable can be the input to multiple data dependence graphs, an alignment is best chosen heuristically by prioritizing graphs with higher loop nest depth. In one illustrative embodiment, an additional packing step is performed, wherein variables with non-conflicting alignment are co-allocated to increase memory efficiency. (e.g., a scalar value with a required alignment of vector alignment +4 bytes, and a scalar value with a required alignment of vector alignment +8 bytes can be co-allocated to a memory space corresponding to a vector register, if the first scalar value requires no more than 4 bytes, even if the values are "live" at the same time). In another, simplified allocation strategy optimized for a fixed desirable computation slot, all scalar variables are allocated at a vector boundary offset corresponding to the fixed desirable computation slot.

Referring now to the optimization of register save and restore code where data contained within at least one register is stored to memory so as to be reloaded from the memory location at a later time (also referred to as spill code), in one illustrative embodiment, each vector register to be spilled can be allocated a spill area corresponding to the vector register to reduce the cost of storing spilled sub-vector data. In another embodiment optimized to reduce the cost of subvector data spills, yet reduce memory area and memory bandwidth consumption, an aligned spill area is allocated and sub-vector spill data are packed with other data that is simultaneously spilled using data packing instructions (such as VMX "vperm" instructions, or other vector packing instructions). In accordance with this optimization, the number of bytes stored, and the number of entries needed to store the spilled data in a store queue, are minimized, and the density in a stack frame is improved. Because data can be packed at the rate of at least 1 data item merged per instruction, the overall number of instructions remains constant, and there is no increase in necessary instruction fetch or processing bandwidth. If address generation is necessary for computing spill area addresses, the pack and store approach can also result in a reduced number of instructions to be executed.

Figure 10A:
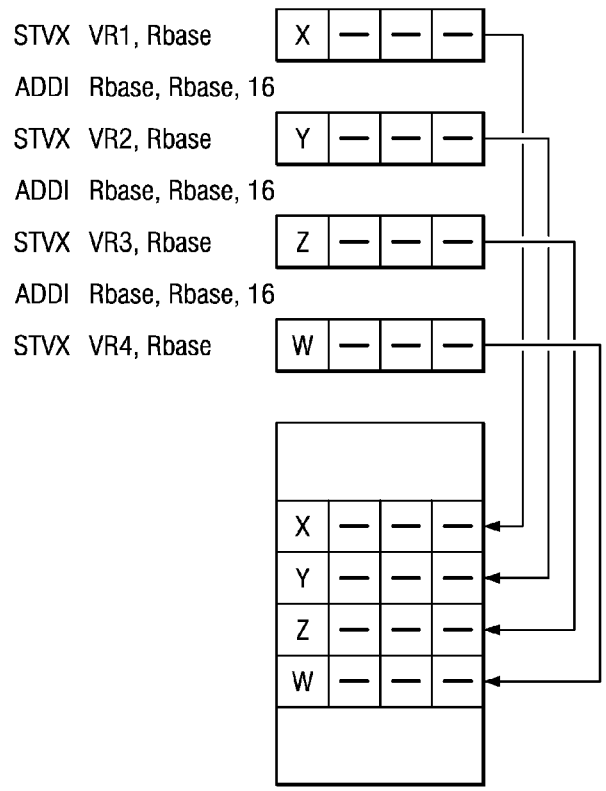
FIGS. 10A and 10B are exemplary diagrams that illustrate an exemplary operation of a first and second version of optimized spilling in accordance with an illustrative embodiment.
Figure 10B:
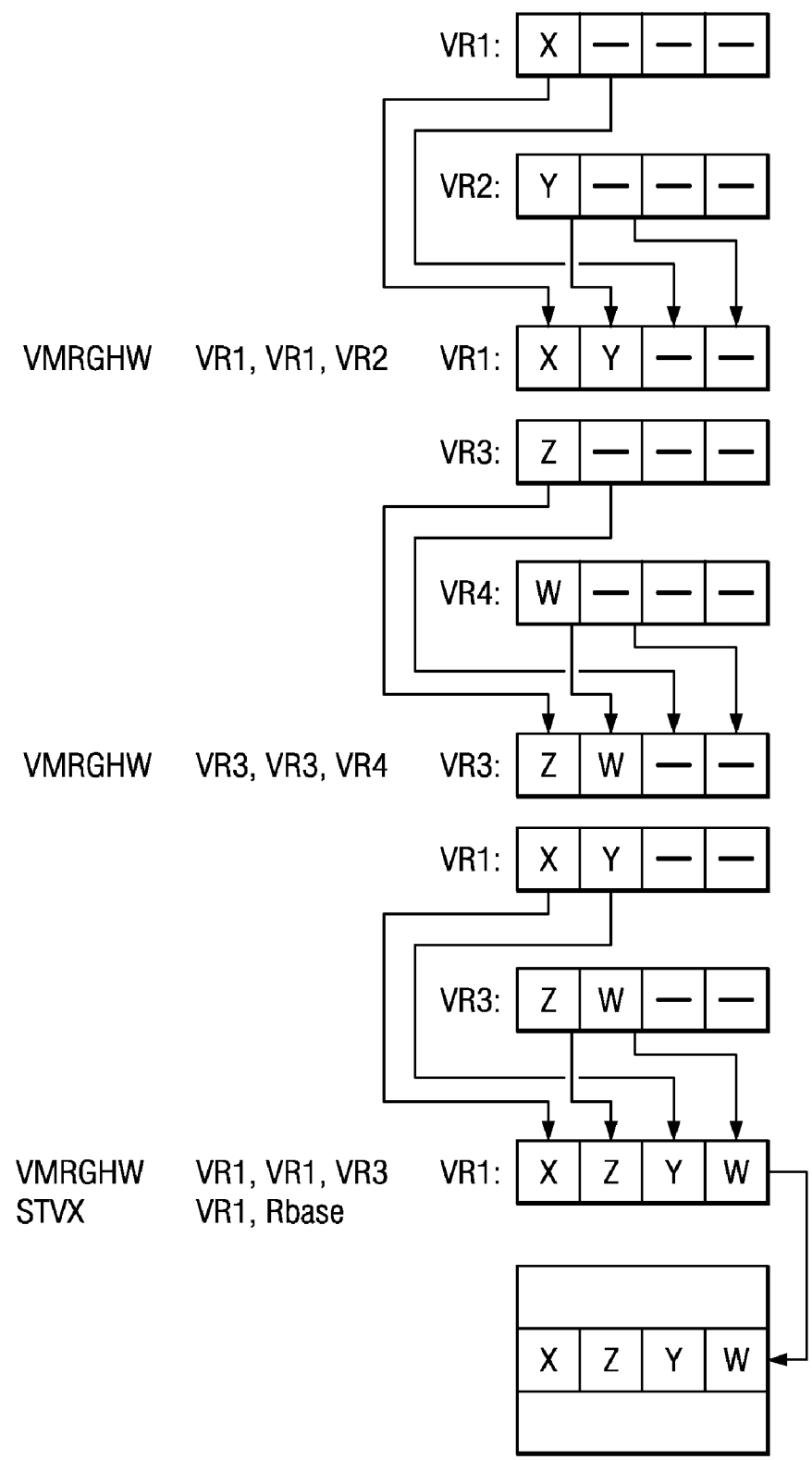

An exemplary code sequence comparing spill using only store to memory instructions, and spill using pack and store instructions are shown in FIGS. 10A and 10B, respectively. As shown in FIGS. 10A and 10B, exemplary fashion for the spilling of 4 scalar words stored in vector registers of 128b length, there is obtained a reduction of instructions from 7 to 4 instructions. In addition, words to be stored first in a store queue, and then in the stack frame, are reduced from 64 bytes to 16 bytes, with commensurate improvements as a result of lower store queue fullness and more efficient cache utilization. Reload of spilled values is optimized commensurately by reducing the number of load operations, and reload address computation operations.

Figure 11:
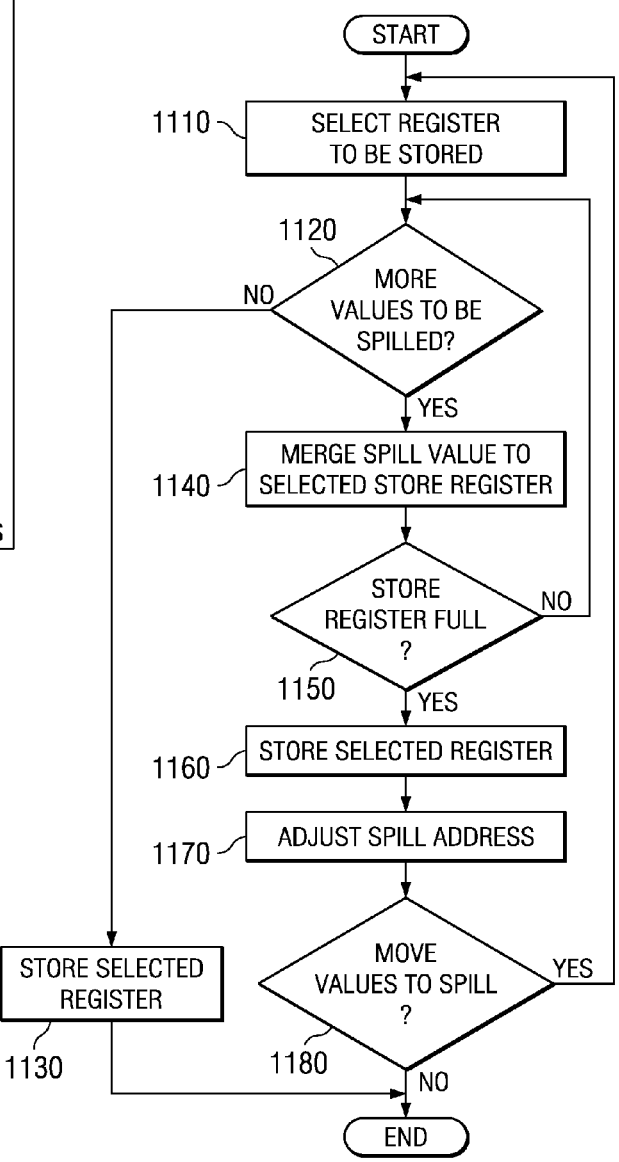
FIG. 11 is an exemplary diagram that illustrates an exemplary operation to merge nodes to be spilled to reduce spill cost in accordance with an illustrative embodiment.

Having thus shown the benefits of optimizing spill code when performing scalar computation in vector registers, FIG. 11 is a flowchart outlining an exemplary operation for implementing a spill code optimization in accordance with an illustrative embodiment. The operation outlined in FIG. 11 may be performed for example, by a compiler operating on application code.

As shown in FIG. 11, the operation starts with a register being selected to be stored in memory (step 1110). A test is made to determine if more values are to be spilled (step 1120). If no more values are to be spilled, code, e.g., the "lvx" instruction of FIG. 10B, is generated to store the selected register to memory (step 1130). The method then terminates.

If more values are to be spilled, code is generated for a value to be spilled to be merged from its register into the selected store candidate register (step 1140). For example, a "vmrghw" instruction in the VMX specification, such as shown in FIG. 10B, may be used to merge two high-order elements in the registers. Those skilled in the art will understand that the register which has been merged into the store candidate is now available for use in other computations. The store candidate, however, is retained.

A test is made whether the store candidate register is full (step 1150). If additional values can be merged into the store candidate register, control returns to step 1120. Otherwise, a store candidate cannot accept additional spill values to be merged in and code is generated to store the selected store candidate register (step 1160). Those skilled in the art will understand that the stored register is now available for other uses.

The spill address is adjusted, optionally by generating code to increment a register (step 1170). A test is made to determine if more values are to be spilled (step 1180). If more values are to be spilled control passes to step 1110. Otherwise, the operation terminates.

Those skilled in the art will understand that code generation can refer to generating intermediate representation pseudo-code, actual machine code, or the like. Those skilled in the art will also understand that other optimizations, such as generating alternate spill code sequences based on data merge (e.g., building a variety of merge data flows corresponding to tress, lists, or other dependence graph structures, using different instructions to merge data, and so forth) may be utilized with the illustrative embodiments without departing from the spirit and scope of the present invention.

Figure 12:
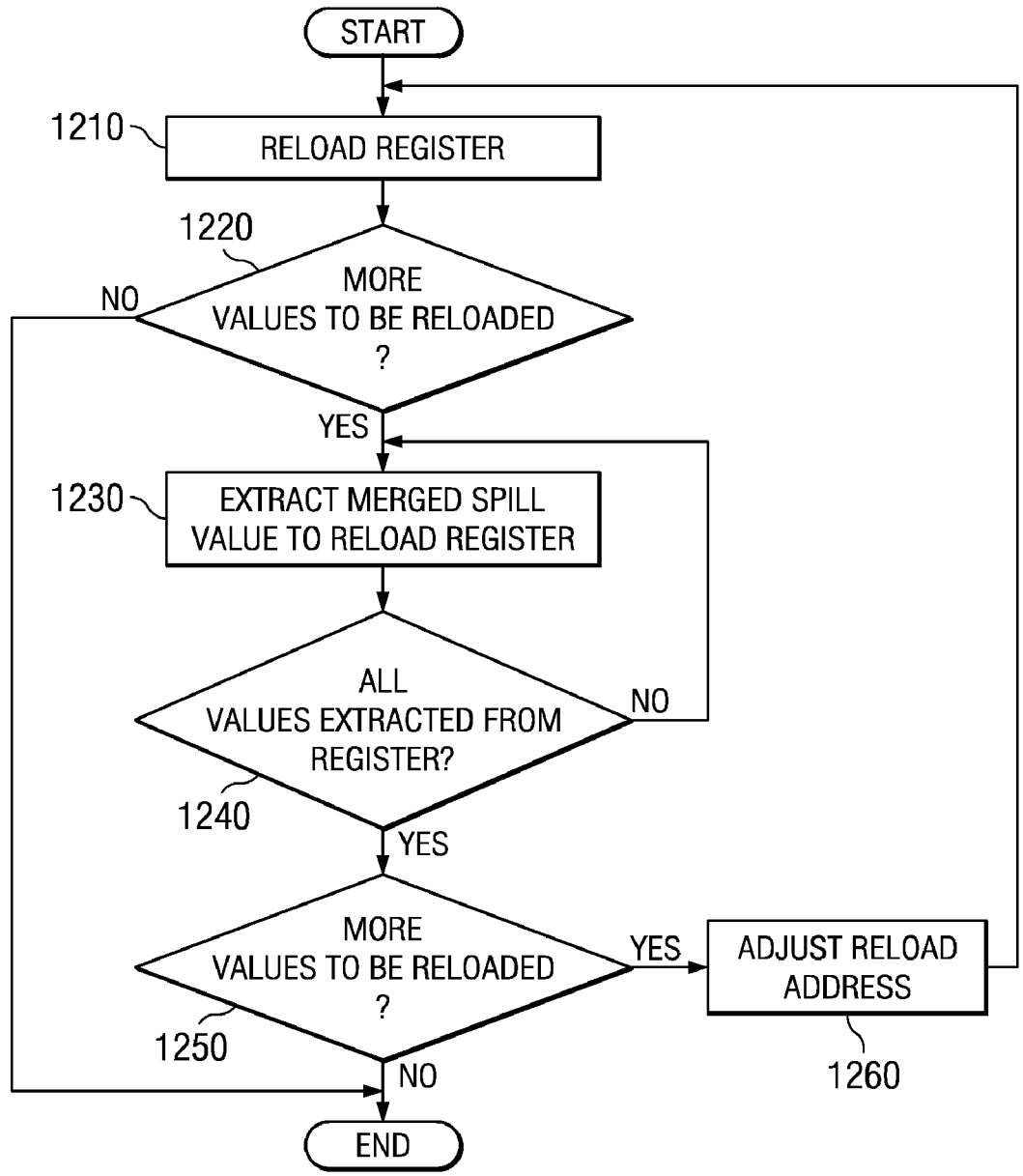
FIG. 12 is an exemplary diagram illustrating an exemplary operation to reload data spilled in accordance with the exemplary operation outlined in FIG. 11.

Referring now to FIG. 12, a flowchart that outlines an exemplary operation for reloading spilled values in accordance with an illustrative embodiment is provided. Again, this operation may be performed, for example, by a compiler operating on application code.

As shown in FIG. 12, the operation starts with code being generated to reload a register, e.g., using an "lvx" load instruction in a VMX-based implementation (step 1210). A test is performed to determine whether additional spilled values should be reloaded (step 1220). If no additional values are to be reloaded, the operation terminates. Otherwise, code is generated to extract a spilled value from the reloaded register which has been previously merged into the register in accordance with operation outlined in FIG. 11 (step 1230).

A test is performed to determine if additional values should be extracted from the reloaded register (step 1240). If additional values are to be extracted, control returns to step 1230. Otherwise, a test is performed to determine if more values should be reloaded (step 1250). If not, the operation terminates. Otherwise, the reload address is adjusted, optionally by generating code to adjust a register holding a reload address (step 1260). Control then transfers to step 1210.

Those skilled in the art will appreciate that merging multiple scalar spill values into a single vector register can free up a sufficient number of vector registers such that no actual spill to memory is necessary in accordance with the illustrative embodiments. Moreover, register pressure can be relieved to a point where internal merge and extract operations are sufficient such that no actual memory store and load operations are necessary. Those skilled in the art will also understand how to apply the teachings of the present invention, and specifically how to modify the operations outlined in FIGS. 11 and 12 to merge data, but not store registers containing merged data. Those skilled in the art will also appreciate that registers containing multiple spill values may not be reallocated until all spill values resident therein are either no longer needed, or have been extracted.

The above illustrative embodiments describe operations for generating optimized code for computing scalar results in a SIMD vector execution unit on a variety of architectural platforms. In addition, the illustrative embodiments provide operations for determining when and what scalar operations should be selected for execution on a SIMD vector execution unit. In one illustrative embodiment, all scalar computations which are computationally combined with vector data are selected for execution on a SIMD vector execution unit to reduce the cost of transferring scalar computational results to the vector execution unit. In another illustrative embodiment, a clustering algorithm may be performed on a dataflow graph, using one of a variety of known or new methods for determining partitioning. In at least one illustrative embodiment, there is performed pre-allocation of at least one operation to either a scalar execution unit, when the operation corresponds to an operation not readily available on a vector execution unit, or conversely, to a vector execution unit, when the operation refers to vector execution, or another operation not readily available on a scalar execution unit.

In one illustrative embodiment, all scalar operations for at least one data type are allocated to be performed on a SIMD vector execution unit because no hardware support for scalar execution of operations involving the data type are provided or because the operations are deprecated. In at least one illustrative embodiment, the operations and apparatus described herein allow to withdraw architectural support for a class of scalar execution unit, e.g., an embedded core wherein a single vector floating point engine can provide an execution environment for both scalar and SIMD floating point computation.

The invention as described above can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the illustrative embodiment has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for generating code to perform scalar operations on a vector execution unit, comprising:

receiving application code, wherein the application code includes a scalar operation;

generating a first load vector instruction, based on the scalar operation, for loading a first scalar value into a first vector register;

generating a second load vector instruction, based on the scalar operation, for loading a second scalar value into a second vector register;

generating a vector computational instruction for combining the first scalar value in the first vector register with the second scalar value in the second vector register to thereby compute a scalar result;

generating code to align a first scalar data word of the first scalar value with respect to the first vector register; and generating code to align a second scalar data word of the second scalar value with respect to the second vector register, wherein an alignment for the first scalar data word and the second scalar data word associated with the first scalar value and second scalar value is derived dynamically by generating third code to compute the alignment at program runtime and wherein the first load vector instruction and the second load vector instruction retrieve arbitrarily aligned data and align the arbitrarily aligned data with respect to the first and second vector registers.

2. The method of claim 1, wherein the computation of the scalar result occurs using a statically designated slot of the first vector register and second vector register.

3. The method of claim 1, wherein the computation of the scalar result occurs using an arbitrary slot of the first vector register and second vector register.

4. The method of claim 3, wherein storage layout of scalar variables is optimized by at least one of allocating a memory word corresponding to the size of a vector register to hold a scalar value or selecting a memory location corresponding to a slot location reducing the amount of data alignment operations necessary.

5. The method of claim 1, wherein registers to be spilled from a register file are merged in a vector register file.

6. An apparatus for generating code to perform scalar operations on a vector execution unit, comprising:
a processor: and
a memory coupled to the processor wherein the memory comprises instructions which, when executed by the processor, cause the processor to:
receive application code, wherein the application code includes a scalar operation;
generate a first load vector instruction, based on the scalar operation, for loading a first scalar value into a first vector register;
generate a second load vector instruction, based on the scalar operation, for loading a second scalar value into a second vector register;
generate a vector computational instruction for combining the first scalar value in the first vector register with the second scalar value in the second vector register to thereby compute a scalar result;
generate code to align a first scalar data word of the first scalar value with respect to the first vector register; and
generate code to align a second scalar data word of the second scalar value with respect to the second vector register, wherein an alignment for the first scalar data word and the second scalar data word associated with the first scalar value and second scalar value is derived dynamically by generating third code to compute the alignment at program runtime and wherein the first load vector instruction and the second load vector instruction retrieve arbitrarily aligned data and align the arbitrarily aligned data with respect to the first and second vector registers.

7. The apparatus of claim 6, wherein the computation of the scalar result occurs using one of a statically designated slot or an arbitrarily determined slot of the first vector register and second vector register.

8. The apparatus of claim 7, wherein storage layout of scalar variables is optimized by at least one of allocating a memory word corresponding to the size of a vector register to hold the scalar value or selecting a memory location corresponding to a slot location reducing the amount of data alignment operations necessary.

9. A computer program product in a computer-readable storage medium having computer readable instructions recorded thereon which, when executed by a computing device, cause the computing device to:
receive application code, wherein the application code includes a scalar operation;
generate a first load vector instruction, based on the scalar operation, for loading a first scalar value into a first vector register;
generate a second load vector instruction, based on the scalar operation, for loading a second scalar value into a second vector register;
generate a vector computational instruction for combining the first scalar value in the first vector register with the second scalar value in the second vector register to thereby compute a scalar result;
generate code to align a first scalar data word of the first scalar value with respect to the first vector register; and
generate code to align a second scalar data word of the second scalar value with respect to the second vector register, wherein an alignment for the first scalar data word and the second scalar data word associated with the first scalar value and second scalar value is derived dynamically by generating third code to compute the alignment at program runtime and wherein the first load vector instruction and the second load vector instruction retrieve arbitrarily aligned data and align the arbitrarily aligned data with respect to the first and second vector registers.

10. The computer program product of claim 9, wherein the computation of the scalar result occurs using one of a statically designated slot or an arbitrarily determined slot of the first vector register and second vector register.

11. The computer program product of claim 10, wherein storage layout of scalar variables is optimized by at least one of allocating a memory word corresponding to the size of a vector register to hold a scalar value or selecting a memory location corresponding to a slot location reducing the amount of data alignment operations necessary.

* * * * *